United States Patent
Yang

(10) Patent No.: US 8,385,014 B2
(45) Date of Patent: Feb. 26, 2013

(54) SYSTEMS AND METHODS FOR IDENTIFYING POTENTIAL MEDIA FAILURE

(75) Inventor: Shaohua Yang, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 163 days.

(21) Appl. No.: 12/901,791

(22) Filed: Oct. 11, 2010

(65) Prior Publication Data

US 2012/0087033 A1    Apr. 12, 2012

(51) Int. Cl.
*G11B 27/36* (2006.01)
*G11B 5/09* (2006.01)

(52) U.S. Cl. .............................. 360/31; 360/46; 360/53
(58) Field of Classification Search ................. None
See application file for complete search history.

(56) References Cited

U.S. PATENT DOCUMENTS

| | | |
|---|---|---|
| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,523,903 A | 6/1996 | Hetzler et al. |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,768,044 A | 6/1998 | Hetzler et al. |
| 5,802,069 A | 9/1998 | Coulson |
| 5,802,118 A | 9/1998 | Bliss et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |

(Continued)

OTHER PUBLICATIONS

U.S. Appl. No. 11/461,026, filed Jul. 31, 2006, Tan.

(Continued)

*Primary Examiner* — Regina M Holder
(74) *Attorney, Agent, or Firm* — Hamilton DeSanctis & Cha

(57) ABSTRACT

Various embodiments of the present invention provide systems and methods for medium utilization control. As an example, a method for identifying potentially damaged media regions is discussed that includes receiving a data set; performing a data detection process on the data set to yield a detected output and a status value corresponding to the data set; performing a data decoding process on the detected output to yield a decoded output; and identifying a region of a storage medium from which the data set was derived as failing based at least in part on the status value.

25 Claims, 5 Drawing Sheets

U.S. PATENT DOCUMENTS

| | | |
|---|---|---|
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,671,404 B1 | 12/2003 | Kawatani et al. |
| 6,697,977 B2 | 2/2004 | Ozaki |
| 6,748,034 B2 | 6/2004 | Hattori et al. |
| 6,757,862 B1 | 6/2004 | Marianetti, II |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,136,244 B1 | 11/2006 | Rothberg |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghaven et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghaven et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghaven et al. |
| 7,702,989 B2 | 4/2010 | Graef et al. |
| 7,712,008 B2 | 5/2010 | Song et al. |
| 7,738,201 B2 | 6/2010 | Jin et al. |
| 7,752,523 B1 | 7/2010 | Chaichanavong |
| 7,801,200 B2 | 9/2010 | Tan |
| 7,802,163 B2 | 9/2010 | Tan |
| 2001/0017904 A1 | 8/2001 | Pukkila et al. |
| 2003/0063405 A1 | 4/2003 | Jin et al. |
| 2003/0081693 A1 | 5/2003 | Raghaven et al. |
| 2003/0087634 A1 | 5/2003 | Raghaven et al. |
| 2003/0112896 A1 | 6/2003 | Raghaven et al. |
| 2003/0134607 A1 | 7/2003 | Raghaven et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song et al. |
| 2006/0195772 A1 | 8/2006 | Graef et al. |
| 2006/0210002 A1 | 9/2006 | Yang et al. |
| 2006/0248435 A1 | 11/2006 | Haratsch |
| 2006/0256670 A1 | 11/2006 | Park et al. |
| 2006/0265634 A1 | 11/2006 | Silvus et al. |
| 2007/0011569 A1 | 1/2007 | Casado et al. |
| 2007/0047121 A1 | 3/2007 | Elefheriou et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0168330 A1 | 7/2008 | Graef et al. |
| 2008/0276156 A1 | 11/2008 | Gunnam |
| 2008/0301521 A1 | 12/2008 | Gunnam |
| 2009/0132893 A1 | 5/2009 | Miyazaki et al. |
| 2009/0185643 A1 | 7/2009 | Fitzpatrick |
| 2009/0199071 A1 | 8/2009 | Graef |
| 2009/0235116 A1 | 9/2009 | Tan et al. |
| 2009/0235146 A1 | 9/2009 | Tan |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghaven et al. |
| 2010/0042877 A1 | 2/2010 | Tan |
| 2010/0042890 A1 | 2/2010 | Gunam |
| 2010/0050043 A1 | 2/2010 | Savin |
| 2010/0061492 A1 | 3/2010 | Noeldner |
| 2010/0070837 A1 | 3/2010 | Xu et al. |
| 2010/0101578 A1 | 4/2010 | Cha et al. |
| 2010/0164764 A1 | 7/2010 | Aravind |
| 2010/0185914 A1 | 7/2010 | Tan et al. |
| 2011/0058631 A1* | 3/2011 | Tan et al. ..................... 375/340 |
| 2011/0075569 A1 | 3/2011 | Marrow et al. |
| 2011/0167246 A1* | 7/2011 | Yang et al. .................... 712/233 |

OTHER PUBLICATIONS

U.S. Appl. No. 11/461,198, filed Jul. 31, 2006, Tan.
U.S. Appl. No. 11/461,283, filed Jul. 31, 2006, Tan.
U.S. Appl. No. 12/540,283, filed Aug. 12, 2009, Liu.
U.S. Appl. No. 12/652,201, filed Jan. 5, 2010, Mathew et al.
U.S. Appl. No. 12/763,050, filed Apr. 19, 2010, Ivkovic et al.
U.S. Appl. No. 12/792,555, filed Jun. 2, 2010, Liu.
U.S. Appl. No. 12/887,317, filed Sep. 21, 2010, Xia et al.
U.S. Appl. No. 12/887,330, filed Sep. 21, 2010, Zhang et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/901,742, filed Oct. 11, 2010, Yang.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System"Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.

Han and Ryan, "Pinning Techniques for Low-Floor Detection/Decoding of LDPC-Coded Partial Response Channels", 5th International Symposium on Turbo Codes &Related Topics, 2008.

Hagenauer, J. et al A Viterbi Algorithm with Soft-Decision Outputs and its Applications in Proc. IEEE Globecom, pp. 47. 11-47 Dallas, TX Nov. 1989.

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Lin et al "An efficient VLSI Architecture for non binary LDPC decoders"—IEEE Transaction on Circuits and Systems II vol. 57, Issue 1 (Jan. 2010) pp. 51-55.

Mohsenin et al., "Split Row: A Reduced Complexity, High Throughput LDPC Decoder Architecture", pp. 1-6, printed from www.ece.ucdavis.edu on Jul. 9, 2007.

Moon et al, "Pattern-dependent noise prediction in signal-dependent Noise," IEEE JSAC, vol. 19, No. 4 pp. 730-743, Apr. 2001.

Perisa et al "Frequency Offset Estimation Based on Phase Offsets Between Sample Correlations" Dept. of Info. Tech. University of Ulm 2005.

Sari H et al., "Transmission Techniques for Digital Terrestrial TV Broadcasting" IEEE Communications Magazine, IEEE Service Center NY, NY vol. 33, No. 2 Feb. 1995.

Selvarathinam, A.: "Low Density Parity-Check Decoder Architecture for High Throughput Optical Fiber Channels" IEEE International Conference on Computer Design (ICCD '03) 2003.

Shu Lin, Ryan, "Channel Codes, Classical and Modern" 2009, Cambridge University Press, pp. 213-222.

Unknown, "Auto threshold and Auto Local Threshold" [online] [retrieved May 28, 2010] Retrieved from the Internet: <URL:http://www.dentristy.bham.ac.uk/landinig/software/autoth.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Wang Y et al., "A Soft Decision Decoding Scheme for Wireless COFDM With Application to DVB-T" IEEE Trans. on Consumer elec., IEEE Service Center, NY,NY vol. 50, No. 1 Feb. 2004.

Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.

Xia et al, "A Chase-GMD algorithm of Reed-Solomon codes on perpendicular channels", IEEE Transactions on Magnetics, vol. 42 pp. 2603-2605, Oct. 2006.

Xia et al, "Reliability-based Reed-Solomon decoding for magnetic recording channels", IEEE International Conference on Communication pp. 1977-1981, May 2008.

Yeo et al., "VLSI Architecture for Iterative Decoders in Magnetic Storage Channels", Mar. 2001, pp. 748-55, IEEE trans. Magnetics, vol. 37, No. 2.

Youn, et al. "BER Perform. Due to Irrreg. of Row-Weight Distrib. of the Parity-Chk. Matirx in Irreg. LDPC Codes for 10-Gb/s Opt. Signls" Jrnl of Lightwave Tech., vol. 23, Sep. 2005.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC TECHRON, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR IDENTIFYING POTENTIAL MEDIA FAILURE

BACKGROUND OF THE INVENTION

The present inventions are related to systems and methods for medium utilization control, and more particularly to systems and methods for identifying potentially damaged media regions.

Storage devices include a medium to which data may be stored and later retrieved. Over the lifetime of the storage system the medium may degrade resulting in failure of particular regions of the storage system. As regions fail, the regions are mapped out such that they are no longer used for future storage. Such failures are, however, often not detected until it is too late to prevent loss of data. This loss of data can be particularly problematic to a user where there is not another copy of the data.

Hence, for at least the aforementioned reasons, there exists a need in the art for advanced systems and methods for determining a potential failure of a region of a storage medium.

BRIEF SUMMARY OF THE INVENTION

The present inventions are related to systems and methods for medium utilization control, and more particularly to systems and methods for identifying potentially damaged media regions.

Various embodiments of the present inventions provide methods for identifying potentially damaged media regions. Such methods include receiving a data set; performing a data detection process on the data set to yield a detected output and a status value corresponding to the data set; performing a data decoding process on the detected output to yield a decoded output; and identifying a region of a storage medium from which the data set was derived as failing based at least in part on the status value. In some cases, the status value may include one or both of a number of violated checks identified during the data detection process and a number of bit errors remaining after the data detection process.

In various instances of the aforementioned embodiments, the status value generated by the data detection process is a first status value and performing the data decoding process further yields a second status value corresponding to the data set. In such cases, identifying the region of the storage medium from which the data set was derived as failing may be further based at least in part on the second status value. In some cases, the second status value may include one or both of a number of violated checks identified during the data decoding process and a number of bit errors remaining after the data decoding process.

In some instances of the aforementioned embodiments, the data detection process is a first data detection process yielding a first detected output, and the data decoding process is a first data decoding process. In such instances, the methods may further include performing a second data detection process on the decoded output to yield a second detected output; and performing a second data decoding process on the second detected output. In some such cases, identifying the region of the storage medium from which the data set was derived as failing based at least in part on the first status value and the second status value is done without using information derived from performing the second data detection process.

In other instances of the aforementioned embodiments, the data detection process is a first data detection process yielding a first detected output, and the data decoding process is a first data decoding process. In some such instances, the methods further include performing a second data detection process on the decoded output to yield a second detected output; and performing a second data decoding process on the second detected output. In such instances, identifying the region of the storage medium from which the data set was derived as failing based at least in part on the first status value is done exclusive of information from performing the second data detection process. In particular cases, where performing the second data decoding process fails to yield a converged data set, the status value is set to a value corresponding to a likelihood of a failing region of the storage medium. In other cases, where performing the data decoding process yields a converged data set, the status value is set to a value corresponding to a likelihood of a non-failing region of the storage medium.

Other embodiments of the present invention provide data processing circuits that include a first data detector circuit operable to: perform a first data detection process on a data set; provide a first detected output; and generate a status value corresponding to the data set. The data processing circuits further include a data decoder circuit operable to perform a data decoding process on the first detected output and to yield a decoded output; a second data detector circuit operable to perform a detection process on the detected output and to yield a second detected output; and a storage medium mapping circuit operable to identify a region of a storage medium from which the data set was derived as failing based at least in part on the status value. In some instances of the aforementioned embodiments, the first data detector circuit includes: a violated checks counter operable to provide a number of violated checks identified in the data set during performance of the first data detection process on the data set; and a bit error reporting circuit operable to output a number of bit errors remaining in the first detected output.

Yet other embodiments of the present invention provide data storage devices that include: a storage medium maintaining a data set at a region on the storage medium; a read/write head assembly operable to sense the data set on the storage medium and to provided a signal representing the data set; and a data processing circuit. The data processing circuit includes: a first data detector circuit operable to perform a first data detection process on a derivative of the signal representing the data set, provide a first detected output, and generate a status value corresponding to the data set; a data decoder circuit operable to perform a data decoding process on the first detected output and to yield a decoded output; a second data detector circuit operable to perform a detection process on the detected output and to yield a second detected output; and a storage medium mapping circuit operable to identify a region of a storage medium from which the data set was derived as failing based at least in part on the status value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple

DETAILED DESCRIPTION OF THE INVENTION

The present inventions are related to systems and methods for medium utilization control, and more particularly to systems and methods for identifying potentially damaged media regions.

Figure 1:
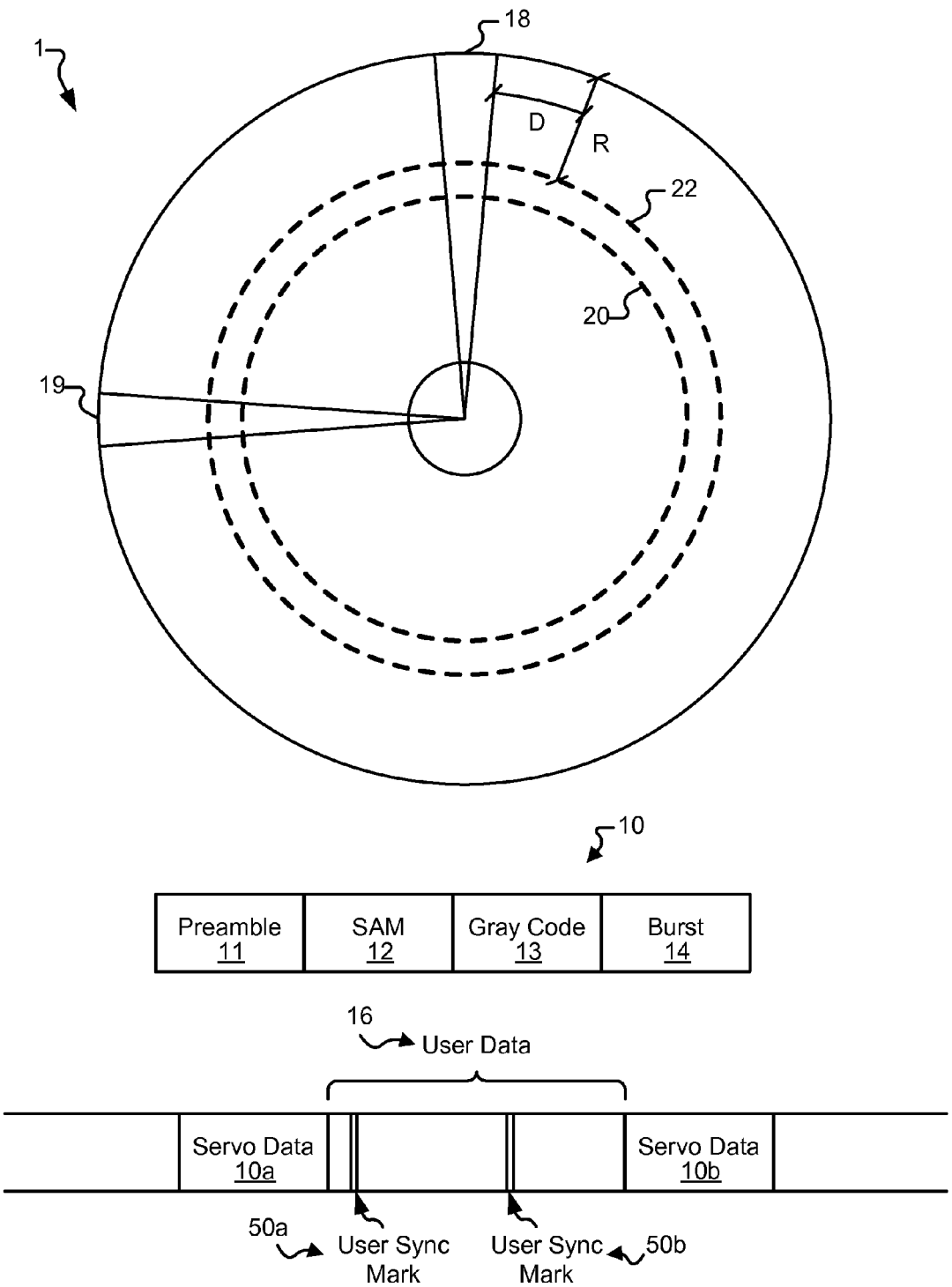
FIG. 1 shows an exemplary prior art storage medium that may be used in relation to one or more embodiments of the present invention.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed.

Figure 2A:
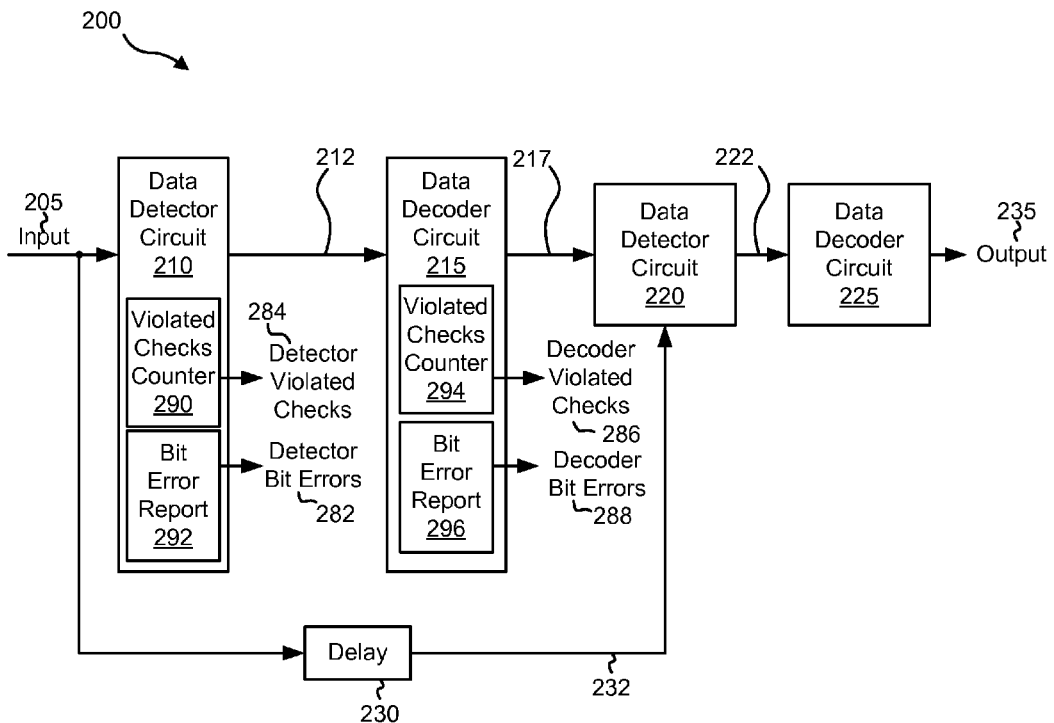
FIG. 2a depicts a data detection and decoding system including interim error reporting circuitry in accordance with one or more embodiments of the present invention.

Turning to FIG. 2a, a data detection and decoding system 200 including interim error reporting circuitry is depicted in accordance with one or more embodiments of the present invention. Data detection and decoding system 200 includes a two stage data detection and decoder circuit where a data detection process is performed by a data detector circuit 210 and a data decoding process is performed by a data decoder circuit 215 during a first processing stage, a data detection process is performed by a data detector circuit 210, and a data decoding process is performed by a data decoder circuit 225 during a second processing stage. Data detector circuit 210 and data detector circuit 220 may be any data detector circuits known in the art. In some cases, both data detector circuit 210 and data detector circuit 220 are the same type of data detectors. In other cases, data detector circuit 210 may be a different type of data detector circuit from data detector circuit 220. Data decoder circuit 215 and data decoder circuit 225 may be any data decoder circuit known in the art. In some cases, both data detector circuit 215 and data decoder circuit 225 are the same type of data decoders. In other cases, data decoder circuit 215 may be a different type of data decoder circuit from data detector circuit 225. In one particular embodiment of the present invention, data detector circuit 210 is a Viterbi algorithm data detector circuit as are known in the art, and data decoder circuit 215 may be a low density parity check circuit as are known in the art. In some embodiments, data detector circuit 220 is also a Viterbi algorithm data detector circuit, and data decoder circuit 225 is also a low density parity check circuit.

Data detector circuit 210 includes a violated checks counter circuit 290 and a bit error reporting circuit 292. Data decoder circuit 215 includes a violated checks counter circuit 294 and a bit error reporting circuit 296. Violated checks counter circuit 290 provides a detector violated checks signal 284. Bit error reporting circuit 292 provides a detector bit errors signal 282. Violated checks counter circuit 294 provides a decoder violated checks signal 286. Bit error reporting circuit 296 provides a decoder bit errors signal 288. As more fully discussed below in relation to FIG. 2b, detector violated checks signal 284, detector bit errors signal 282, decoder violated checks signal 286, and decoder bit errors signal 288 are used to determine whether a region from which a currently processing data set exhibits a probability of failure.

In operation, an input 205 is received by data detector circuit 210. Input 205 may be a series of digital values corresponding to magnetic values detected from a storage medium. Based upon the disclosure provided herein, one of ordinary skill in the art will recognize a variety of types of inputs and/or sources of inputs that may be used in relation to different embodiments of the present invention. Data detector circuit 210 performs a data detection process on input 205. Part of the detection process involves determining whether checks included in an encoded data set received as input 205 have been violated. As each check violation is identified, violated checks counter circuit 290 is incremented and the value on the counter is ultimately provided as detector violated checks signal 284. As is known in the art, the detection process modifies one or more bits of received input 205 based upon the violated checks to resolve various bit errors. Where the processing does not converge, one or more bit errors remain. This number of bit errors is reported by bit error reporting circuit 292 as detector bit errors signal 282.

A resulting detected data set 212 is provided to data decoder circuit 215. Data decoder circuit 215 performs a data decoding process on detected data set 212. Part of the decoding process involves determining whether checks included in an encoded data set received as input 205 have been violated. As each check violation is identified, violated checks counter circuit 294 is incremented and the value on the counter is ultimately provided as decoder violated checks signal 286. As is known in the art, the decoding process modifies one or more bits of detected data set 212 based upon the violated checks to resolve various bit errors. Where the processing does not converge, one or more bit errors remain. This number of bit errors is reported by bit error reporting circuit 296 as decoder bit errors signal 288. A resulting decoded data set 217 is provided to data detector circuit 220.

Input 205 delayed by a delay circuit 230 by an amount corresponding to the time required to process through data detector circuit 210 and data decoder circuit 215 to yield a delayed input 232. Delayed input 232 and decoded data set 217 are provided to data detector circuit 220. Data detector circuit 220 performs a data detection process that yields a detected output 222. Detected output 222 is provided to a data decoder circuit 225 that performs a data decoding process yielding an output 235.

Figure 2B:
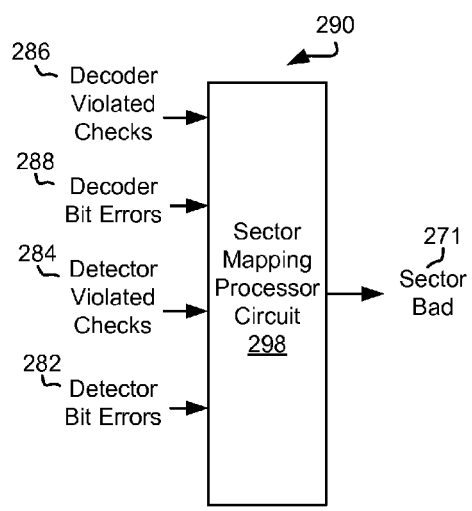
FIG. 2b shows a sector mapping processor circuit using outputs from the data detection and decoding system of FIG. 2a to identify bad sectors.

It has been discovered that various parameters associated with initial data detection and/or data decoding processes have a strong correlation to the viability of the region of the medium from which the processed data was derived. Turning to FIG. 2b, a sector mapping processor circuit 290 that receives detector violated checks signal 284, detector bit errors signal 282, decoder violated checks signal 286, and decoder bit errors signal 288 and combines the aforementioned signals into a value representing a potential that a region of a medium from which the processed data was derived exhibits a probability of failure. For example, a status value may be calculated in accordance with the following equation:

Status Value=Detector Violated Checks 284+Detector Bit Errors 282+Decoder Violated Checks 286+ Decoder Bit Errors 288

Where this status value exceeds a predefined threshold value, the region may identified as a failing region by sector mapping processor circuit 290. In such a case, sector mapping processor circuit 290 asserts a sector bad signal 271. Sector bad signal 271 is in turn used to indicate a sector to which data is not to be written in the future. In the future as data is written to the medium, the particular region identified as bad will not be used as it will be mapped out.

Alternatively, the status value may be a binary value where a logic '1' indicates a sector of poor quality and a logic '0' indicates a sector of acceptable quality. In such a case, sector mapping processor circuit 290 receives detector violated checks signal 284, detector bit errors signal 282, decoder violated checks signal 286, and decoder bit errors signal 288 and combines the aforementioned signals into the binary status value in accordance with the following equation:

Status Value=(Detector Violated Checks 284>Threshold A)||(Detector Bit Errors 282>Threshold B)|| (Decoder Violated Checks 286>Threshold C)|| (Decoder Bit Errors 288>Threshold D), where the symbol '||' indicates a logical OR function, and where satisfying any of the '>' operations results in a logic '1' and failure to satisfy the '>' operation results in a logic '0'. The values of Threshold A, Threshold B, Threshold C and Threshold D may be hardwired, individually programmable (i.e., programming a value for one of the thresholds is independent of the others), or collectively programmable (i.e., programming a value for one of the thresholds causes a corresponding value to be programmed in one or more of the other thresholds). Where this status value is non-zero, the region may be identified as a failing region by sector mapping processor circuit 290. In such a case, sector mapping processor circuit 290 asserts a sector bad signal 271. Sector bad signal 271 is in turn used to indicate a sector to which data is not to be written in the future. In the future as data is written to the medium, the particular region identified as bad will not be used as it will be mapped out.

It should be noted that one of ordinary skill in the art will recognize other combinations of one or more of detector violated checks signal 284, detector bit errors signal 282, decoder violated checks signal 286, and decoder bit errors signal 288 that may be used to determine a potential failure of a given region on a storage medium. For example, the aforementioned summation approach could be done multiple times to create a running average, and the running average compared with a threshold to determine whether the region is bad. Again, a number of combinations may be used to determine the continuing viability of the region.

Figure 3B:
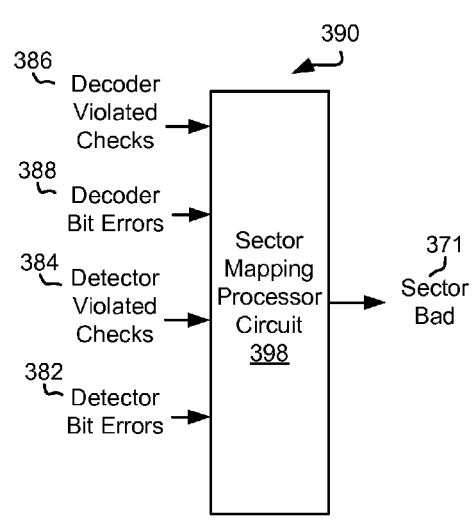
FIG. 3b depicts a sector mapping processor circuit using outputs from the data detection and decoding system of FIG. 3a to identify bad sectors.
Figure 3A:
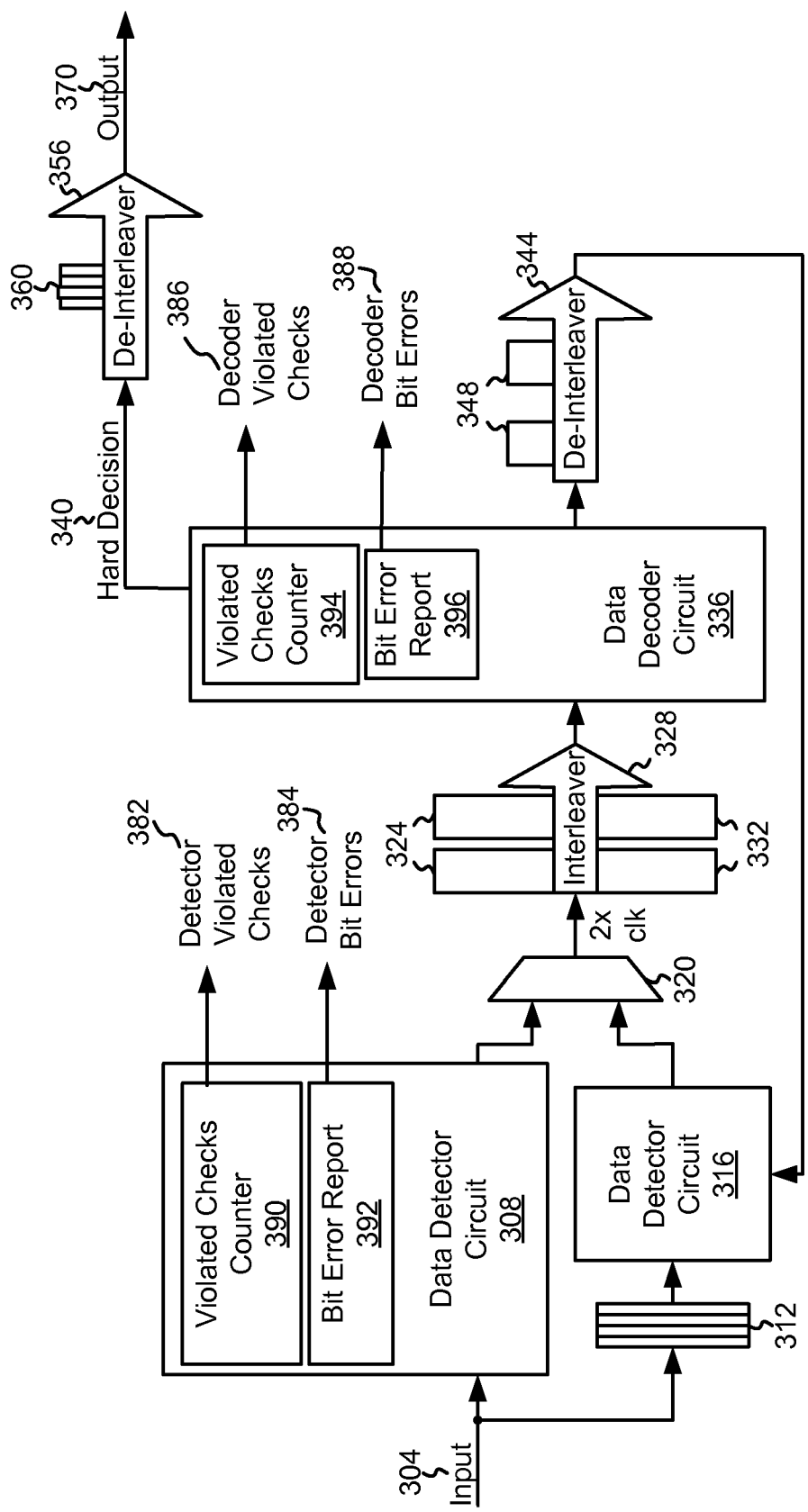
FIG. 3a shows another data detection and decoding system including interim error reporting circuitry in accordance with one or more embodiments of the present invention.

Turning to FIG. 3a, another data detection and decoding system 300 is shown in accordance with one or more embodiments of the present invention that includes interim error reporting circuitry. Data detection and decoding system 300 includes a variable stage data detection and decoder circuit that provides for at least two stages of processing. In particular a first stage of data detection processing and data decoding processing is performed by a combination of data detector circuit 308 and a data decoding circuit 336. One or more subsequent stages of data detection processing and data decoding processing are performed by a combination of data detector circuit 316 and data decoding circuit 336. Data detector circuit 308 and data detector circuit 316 may be any data detector circuit known in the art including, but not limited to, a soft output Viterbi algorithm detector or a maximum a posteriori (MAP) detector. Based on the disclosure provided herein, one of ordinary skill in the art will recognize a variety of data detectors that may be used in accordance with different embodiments of the present invention. In some cases, both data detector circuit 308 and data detector circuit 316 are the same type of data detectors. In other cases, data detector circuit 308 may be a different type of data detector circuit from data detector circuit 316. Data decoder circuit 336 may be any data decoder circuit known in the art. In some cases, data decoder circuit 336 is a low density parity check decoder circuit as are known in the art, and both data detector circuit 308 and data detector circuit 316 are Viterbi algorithm data detector circuits as are known in the art. Based on the disclosure provided herein, one of ordinary skill in the art will recognize a variety of data detector circuits and/or data decoder circuits that may be used in accordance with different embodiments of the present invention.

Data detection and decoding system 300 includes a data input 304 that is fed to data detector circuit 308. Data input 304 may be a series of digital values corresponding to magnetic values detected from a storage medium. Based upon the disclosure provided herein, one of ordinary skill in the art will recognize a variety of types of inputs and/or sources of inputs that may be used in relation to different embodiments of the present invention. In addition, data input 304 is provided to a input data buffer 312 that is designed to hold a number of data sets received from data input 304. The size of input data buffer 312 may be selected to provide sufficient buffering such that a data set input via data input 304 remains available at least until a first iteration processing (i.e., data detection and data decoding) of that same data set is complete and the processed data is available in a ping pong buffer 348 (i.e., a queuing buffer) as more fully described below. Input data buffer 312 provides the data sets to a data detector circuit 316. Similar to data detector circuit 308, data detector circuit 316 may be any type of data detector known in the art including, but not limited to, a SOVA detector or a MAP detector. Again, based on the disclosure provided herein, one of ordinary skill in the art will recognize a variety of data detectors that may be used in accordance with different embodiments of the present invention.

A detected output from data detector circuit 308 and a detected output from data detector circuit 316 are provided to an interleaver circuit 328 via a multiplexer 320. Such outputs may be, for example, log likelihood ratio values. Interleaver circuit 320 interleaves the output of data detector circuit 308 and separately interleaves the output of data detector circuit 316 using two ping pong buffers 324, 332. One of the buffers in ping pong buffer 324 holds the result of a prior interleaving process of the output from data detector circuit 308 and is unloaded to data decoder circuit 336, while the other buffer of ping pong buffer 324 holds a data set from data detector circuit 308 that is currently being interleaved. Similarly, one of the buffers in ping pong buffer 332 holds the result of a prior interleaving process of the output from data detector circuit 316 and is unloaded to data decoder circuit 336, while the other buffer of ping pong buffer 324 holds a data set from data detector circuit 316 that is currently being interleaved.

Data decoder circuit 336 is capable of decoding one or more data sets simultaneously. As an example, data decoder circuit 336 may be designed to decode an interleaved data set from ping pong buffer 324, or an interleaved data set from ping pong buffer 332, or to decode interleaved data sets from ping pong buffer 324 and ping pong buffer 332 simultaneously. The decoded data is either provided as a hard decision output 340 and/or to a de-interleaver circuit 344 that uses ping pong buffer 348 to de-interleave the decoded data and to provide the de-interleaved data as an input to data detector circuit 316. One of the buffers in ping pong buffer 348 holds the result of a prior de-interleaving process and is unloaded to data detector circuit 316, while the other buffer of ping pong buffer 348 holds a decoded data set currently being de-interleaved. Hard decision output 340 is provided to a de-interleaver circuit 356 that de-interleaves hard decision output 340 and stores the de-interleaved result in an output data buffer 360. Ultimately, de-interleaver circuit 356 provides the de-interleaved data stored in output data buffer 360 as an output 370.

In operation, a first data set is introduced via data input 304 to data detector circuit 308. Data detector circuit 308 performs its data detection algorithm and provides both a hard output and a soft output to multiplexer 320. Part of the detection process performed by data detector circuit 308 involves determining whether checks included in an encoded data set received as data input 304 have been violated. As each check violation is identified, a violated checks counter 390 is incremented and the value on the counter is ultimately provided as detector violated checks signal 382. As is known in the art, the detection process modifies one or more bits of received data input 304 based upon the violated checks to resolve various bit errors. Where the processing does not converge, one or more bit errors remain. This number of bit errors is reported by bit error reporting circuit 392 as detector bit errors signal 384.

The hard and soft decision data provides as the output of data detector circuit 308 is written to one buffer of ping pong buffer 324. At the same time the detector output is written into the buffer, interleaver 328 interleaves the data set by writing consecutive data into non-consecutive memory/buffer addresses based on the interleaver algorithm/mapping. Once interleaver 324 completes its interleaving process, the interleaved data is decoded by data decoder circuit 336. Where the data converges, data decoder circuit 336 writes its output as hard decision output 340 to output data buffer 360 and the processing is completed for that particular data set. Alternatively, where the data does not converge, data decoder circuit 336 writes its output (both soft and hard) to ping pong buffer 348. As more fully described below, the scheduling guarantees that there is at least one empty buffer for holding this new set of data, and this strategy assures that each data input is guaranteed the possibility of at least two global iterations (i.e., two passes through a detector and decoder pair).

Part of the decoding process performed by data decoder circuit 336 involves determining whether checks included in an encoded data set received as data input 304 via data detector circuit 308 have been violated. As each check violation is identified, a violated checks counter 394 is incremented and the value on the counter is ultimately provided as decoder violated checks signal 386. As is known in the art, the decoding process modifies one or more bits of received data input 304 based upon the violated checks to resolve various bit errors. Where the processing does not converge, one or more bit errors remain. This number of bit errors is reported by bit error reporting circuit 396 as decoder bit errors signal 388. In some cases, decoder violated checks signal 386 and decoder bit errors signal 388 are only provided on the initial pass of the particular data set through data decoder circuit 336.

The data written to ping pong buffer 348 is fed back to data detector circuit 316. Data detector circuit 316 selects the data set that corresponds to the output in ping pong buffer 348 from input data buffer 312 and performs a subsequent data detection aided by the soft output data generated by data decoder circuit 336 fed back from ping pong buffer 348. By using the previously generated soft data for data maintained in input data buffer 312, data detector circuit 316 generally performs a subsequent data detection with heightened accuracy. The output of this subsequent data detection is passed to interleaver 328 via multiplexer 320. The data is written to one buffer of ping pong buffer 332, and interleaver 328 interleaves the data. The interleaved data is then passed to data decoder circuit 336 where it is decoded a second time. Similar to the first iteration, a decision is made as to whether the data converged or whether there is insufficient space in ping pong buffer 348 to handle the data. Where such is the case, data decoder circuit 336 writes its output as hard decision output 340 to output data buffer 360 and the processing is complete for that particular data set. Alternatively, where the data does not converge and there is sufficient buffer space in ping pong buffer 348 to receive an additional data set, writes its output (both soft and hard) to ping pong buffer 348 where it is passed back to data detector circuit 316 for a third pass. Sufficient space is defined in ping pong buffer 348 by having at least reserved space for the data set from the first detector and decoder after the data set from the second detector and decoder is written into the ping pong buffer.

It should be noted that, as an example, a first data set may be applied at data input 304 and that it takes a number of iterations to converge while all subsequent data sets applied at data input 304 converge on the first pass (i.e., on a single iteration). In such a case, the first data set may be processed a number of times (i.e., a number of iterations) that is limited by the amount of memory available in output data buffer 360. Once output data buffer 360 is full or once an ordered set of outputs are available, the most recent hard decision output corresponding to the first data set is provided as a hard decision output and de-interleaver 356 re-orders the outputs putting the first output in the first position. With this done, output data buffer 360 are flushed out as output 370. In some embodiments of the present invention, de-interleaver 356 does not perform a re-ordering function and output data buffer 360 has a very limited size. In such a case, it is conceivable that a data set could be processed a very large number of times (i.e., a large number of iterations) only limited by how long a recipient of output 370 is willing to wait for the data. As another example, it is possible that all data applied as data input 304 converges on its first pass. In such a case, data detector circuit 316, data decoder circuit 336 and/or de-interleaver 344 may be placed in a power saving mode to conserve power. As yet another example, it may be the case that all data sets applied at data input 304 fail to converge on the first pass (i.e., a single iteration). In such a case, all data sets would be iterated twice. It should also be noted that one or more additional data detectors may be added along with additional space in ping pong buffers 324, 332, 248 that would facilitate more iterations in the situation where a significant number of closely located data sets fail to converge. In such cases, all data sets can be guaranteed to be decoded with number of iterations the same as the number of detectors.

It has been discovered that various parameters associated with initial data detection and/or data decoding processes have a strong correlation to the viability of the region of the medium from which the processed data was derived. Turning to FIG. 3b, a sector mapping processor circuit 390 that receives detector violated checks signal 384, detector bit errors signal 382, decoder violated checks signal 386, and decoder bit errors signal 388 and combines the aforementioned signals into a value representing a potential that a region of a medium from which the processed data was derived exhibits a probability of failure. For example, a status value may be calculated in accordance with the following equation:

Status Value=Detector Violated Checks 384+Detector Bit Errors 382+Decoder Violated Checks 384+ Decoder Bit Errors 388

Where this status value exceeds a predefined threshold value, the region may identified as a failing region by sector mapping processor circuit 390. In such a case, sector mapping processor circuit 390 asserts a sector bad signal 371. Sector bad signal 371 is in turn used to indicate a sector to which data is not to be written in the future. In the future as data is written to the medium, the particular region identified as bad will not be used as it will be mapped out.

Alternatively, the status value may be a binary value where a logic '1' indicates a sector of poor quality and a logic '0' indicates a sector of acceptable quality. In such a case, sector mapping processor circuit 390 receives detector violated checks signal 384, detector bit errors signal 382, decoder violated checks signal 386, and decoder bit errors signal 388 and combines the aforementioned signals into the binary status value in accordance with the following equation:

Status Value=(Detector Violated Checks 384>Threshold A)||(Detector Bit Errors 382>Threshold B)|| (Decoder Violated Checks 386>Threshold C)|| (Decoder Bit Errors 388>Threshold D), where the symbol '||' indicates a logical OR function, and where satisfying any of the '>' operations results in a logic '1' and failure to satisfy the '>' operation results in a logic '0'. The values of Threshold A, Threshold B, Threshold C and Threshold D may be hardwired, individually programmable (i.e., programming a value for one of the thresholds is independent of the others), or collectively programmable (i.e., programming a value for one of the thresholds causes a corresponding value to be programmed in one or more of the other thresholds). Where this status value is non-zero, the region may be identified as a failing region by sector mapping processor circuit 390. In such a case, sector mapping processor circuit 390 asserts a sector bad signal 371. Sector bad signal 371 is in turn used to indicate a sector to which data is not to be written in the future. In the future as data is written to the medium, the particular region identified as bad will not be used as it will be mapped out.

Figure 4:
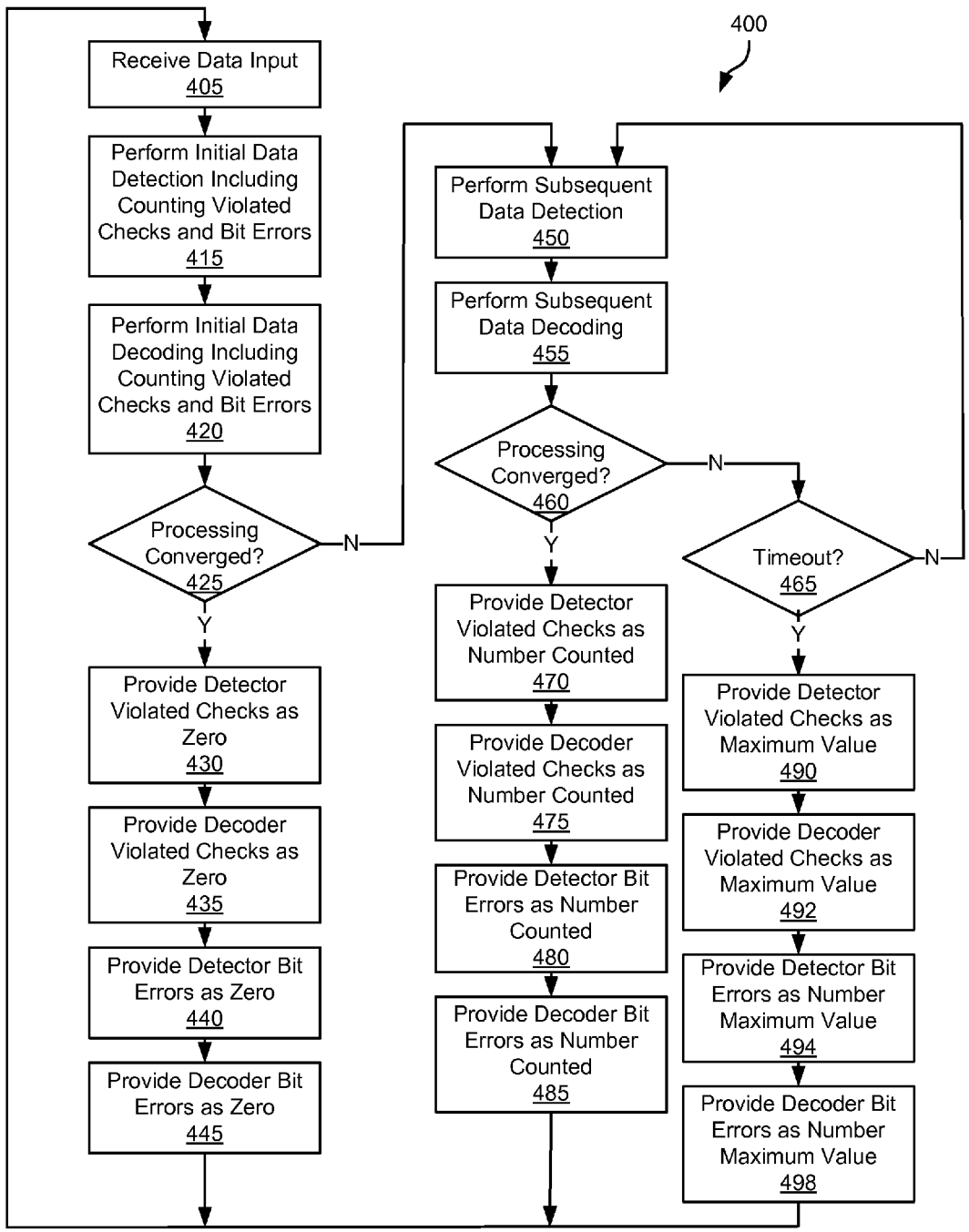
FIG. 4 is a flow diagram showing a method in accordance with various embodiments of the present invention for predicting potential failures of a region of a storage medium.

It should be noted that one of ordinary skill in the art will recognize other combinations of one or more of detector violated checks signal 384, detector bit errors signal 382, decoder violated checks signal 386, and decoder bit errors signal 388 that may be used to determine a potential failure of a given region on a storage medium. For example, the aforementioned summation approach could be done multiple times to create a running average, and the running average compared with a threshold to determine whether the region is bad. Again, a number of combinations may be used to determine the continuing viability of the region Turning to FIG. 4, a flow diagram 400 shows a method in accordance with various embodiments of the present invention for predicting potential failures of a region of a storage medium. Following flow diagram 400, a data input is received (block 405). The received data input may be a series of digital values that correspond to data maintained on a storage medium. Based upon the disclosure provided herein, one of ordinary skill in the art will recognize a number of formats of the data input and/or variety of sources of the received data input that may be utilized in accordance with different embodiments of the present invention. An initial data detection process is applied to the received data input (block 415). This detection process may be any detection process known in the art including, but not limited to, a maximum a posteriori detection process or a Viterbi algorithm detection process. Part of the detection process involves determining whether checks included in encoded into the received data input have been violated. As each check violation is identified, a violated checks counter is incremented and the resulting count is provided as an output. Further, as is known in the art, the detection process modifies one or more bits of the received input based upon the violated checks to resolve various bit errors. Where the detection process does not converge, one or more bit errors remain and this number of bit errors is reported.

A decoding process is then performed on the resulting detected data set (block 420). This decoding process may be any decoding process known in the art including, but not limited to, a low density parity check decoding process. Part of the decoding process involves determining whether checks included in encoded into the received data input have been violated. As each check violation is identified, a violated checks counter is incremented and the resulting count is provided as an output. Further, as is known in the art, the decoding process modifies one or more bits of the received input based upon the violated checks to resolve various bit errors. Where the decoding process does not converge, one or more bit errors remain and this number of bit errors is reported.

It is determined whether the combination detection processing (block 415) and decoding processing (block 420) converged (i.e., resolved all violated checks and bit errors in the received data set) (block 425). Where the processing converged (block 425), the number of violated checks and the number of bit errors from the data detection process are reported as zero (block 430 and block 440). Further, where the processing converged (block 425), the number of violated checks and the number of bit errors from the data decoding process are reported as zero (block 435 and block 445).

Alternatively, where the processing failed to converge (block 425), a subsequent data detection process is performed on the output from the preceding data decoding process (block 450). Then, a subsequent data decoding process is performed on the output from the subsequent data detection process (block 455). It is determined whether this subsequent combination of data detection processing and data decode processing converged (i.e., resolved all violated checks and bit errors in the received data set) (block 460). Where the processing converged (block 460), the actual values of the number of violated checks and the number of bit errors from the data detection process are reported (block 470 and block 480). Further, where the processing converged (block 460), the number of violated checks and the number of bit errors from the data decoding process are reported as zero (block 475 and block 485).

Where the processing did converge (block 460), it is determined whether a timeout condition has been met (block 465). In some cases, the timeout condition only allows for two total combinations of detection processing and decoding processing similar as that implemented in the circuit of FIG. 2a. In this case, the timeout condition is always met. In other cases, the number of combinations of detection processing and decoder processing is variable similar to that discussed above in relation to FIG. 3a. In such a case, the timeout condition may be tied to the total number of data sets being processed and the mount of buffer space available, and/or a maximum timeout condition. Where the timeout condition has not yet been reached (block 465), the processes of blocks 450-460 are repeated using the results of the latest detection and decoding processing. Otherwise, where the timeout condition has not yet been reached (block 465), convergence was not achieved. In such a case, the number of violated checks and the number of bit errors from the data detection process are reported as a predefined maximum value (block 490 and block 494). Further, where the processing converged (block 465), the number of violated checks and the number of bit errors from the data decoding process are reported as zero (block 492 and block 498).

Figure 5:
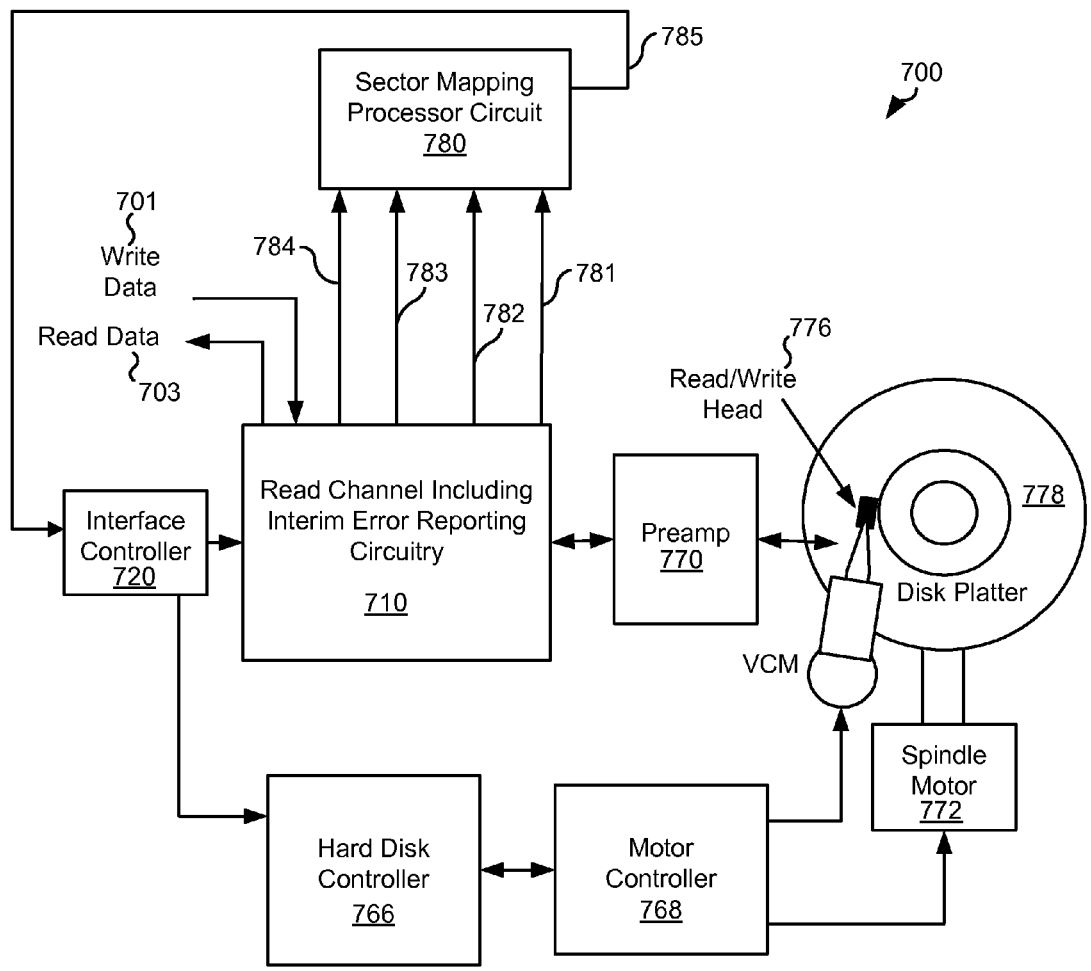
FIG. 5 shows a storage system including a read channel circuit with interim error reporting circuitry capable of supporting a sector mapping processor circuit in accordance with some embodiments of the present invention.

Turning to FIG. 5, a storage system 700 including a read channel circuit 710 with interim error reporting circuitry capable of supporting a sector mapping processor circuit 780 in accordance with some embodiments of the present invention. In particular, read channel circuit 710 includes interim error reporting circuitry that provides a detector violated checks signal 781, a detector bit errors signal 782, a decoder violated checks signal 783, and a decoder bit errors signal 784 to sector mapping processor circuit 780. Detector violated checks signal 781 is a value corresponding to the number of violated checks detected during the first pass through a data detector circuit included in read channel circuit 710. Detector bit errors signal 782 is a value corresponding to the number of bit errors detected during the first pass through a data detector circuit included in read channel circuit 710. Decoder violated checks signal 783 is a value corresponding to the number of violated checks detected during the first pass through a data decoder circuit included in read channel circuit 710. Decoder bit errors signal 782 is a value corresponding to the number of bit errors detected during the first pass through a data decoder circuit included in read channel circuit 710.

Storage system 700 also includes a preamplifier 770, an interface controller 720, a hard disk controller 766, a motor controller 768, a spindle motor 772, a disk platter 778, and a read/write head 776. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with either a longitudinal or a perpendicular recording scheme.

In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel circuit 710 via preamplifier 770. Preamplifier 770 is operable to amplify the minute analog signals accessed from disk platter 778. In turn, read channel circuit 710 decodes and digitizes the received analog signal to recreate the information originally written to disk platter 778. This data is provided as read data 703 to a receiving circuit.

As part of detecting and decoding the received information, read channel circuit 710 performs an initial data detection and an initial data decoding process. The number of violated checks identified during the initial detection process are reported as detector violated checks signal 781 to sector mapping processor circuit 780, and the number of remaining bit errors after the initial data detection process are reported as detector bit errors signal 782 to sector mapping processor circuit 780. In addition, the number of violated checks identified during the initial decoder process are reported as decoder violated checks signal 783 to sector mapping processor circuit 780, and the number of remaining bit errors after the initial data decoder process are reported as decoder bit errors signal 784 to sector mapping processor circuit 780. Sector mapping processor circuit 780 algorithmically combines the received inputs to yield a memory region status value. For example, the memory region status value may be calculated in accordance with the following equation:

Region Status Value=Detector Violated Checks 781+ Detector Bit Errors 782+Decoder Violated Checks 783+Decoder Bit Errors 784

Where this memory region status value exceeds a predefined threshold value, the region is identified as a failing region and data from the failing region is transferred to another region, and the identified region is identified as unusable. Based upon the disclosure provided herein, one of ordinary skill in the art will recognize other combinations of one or more of detector violated checks signal 781, detector bit errors signal 782, decoder violated checks signal 783 and/or decoder bit errors signal 784 that may be used to determine a potential failure of a given region on a storage medium. A write operation is substantially the opposite of the preceding read operation with write data 701 being provided to read channel circuit 710. This data is then encoded and written to disk platter 778.

Alternatively, the status value may be a binary value where a logic '1' indicates a sector of poor quality and a logic '0' indicates a sector of acceptable quality. In such a case, sector mapping processor circuit 780 receives detector violated checks signal 781, detector bit errors signal 782, decoder violated checks signal 783, and decoder bit errors signal 784 and combines the aforementioned signals into the binary status value in accordance with the following equation:

Status Value=(Detector Violated Checks 781>Threshold $A$)||(Detector Bit Errors 782>Threshold $B$)|| (Decoder Violated Checks 783>Threshold $C$)|| (Decoder Bit Errors 784>Threshold $D$), where the symbol '||' indicates a logical OR function, and where satisfying any of the '>' operations results in a logic '1' and failure to satisfy the '>' operation results in a logic '0'. The values of Threshold A, Threshold B, Threshold C and Threshold D may be hardwired, individually programmable (i.e., programming a value for one of the thresholds is independent of the others), or collectively programmable (i.e., programming a value for one of the thresholds causes a corresponding value to be programmed in one or more of the other thresholds). Where this status value is non-zero, the region may be identified as a failing region by sector mapping processor circuit 780. In such a case, sector mapping processor circuit 780 asserts a sector bad signal 785. Sector bad signal 785 is in turn used to indicate a sector to which data is not to be written in the future. In the future as data is written to the medium, the particular region identified as bad will not be used as it will be mapped out.

It should be noted that storage system 700 may be integrated into a larger storage system such as, for example, a RAID (redundant array of inexpensive disks, redundant array of independent disks, or generically a redundant array of disks) based storage system. It should also be noted that various functions or blocks of storage system 700 may be implemented in either software or firmware, while other functions or blocks are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for medium utilization control. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for identifying potentially damaged media regions, the method comprising:
 receiving a data set;
 performing a data detection process on the data set to yield a detected output;
 generating a status value, wherein the status value is selected from a group consisting of: a number of violated checks identified during the data detection process, and a number of bit errors remaining after the data detection process;
 performing a data decoding process on the detected output to yield a decoded output; and
 identifying a region of a storage medium from which the data set was derived as failing based at least in part on the status value.

2. The method of claim 1, wherein the status value includes both a number of violated checks identified during the data detection process and a number of bit errors remaining after the data detection process.

3. The method of claim 1, wherein the status value is a first status value, and wherein the performing the data decoding process further yields a second status value corresponding to the data set, and wherein identifying the region of the storage medium from which the data set was derived as failing is further based at least in part on the second status value.

4. The method of claim 3, wherein the status value is selected from a group consisting of: a number of violated checks identified during the data decoding process, and a number of bit errors remaining after the data decoding process.

5. The method of claim 3, wherein the second status value includes both a number of violated checks identified during the data decoding process and a number of bit errors remaining after the data decoding process.

6. The method of claim 3, wherein the data detection process is a first data detection process, wherein the detected output is a first detected output, wherein the data decoding process is a first data decoding process, and wherein the method further comprises:
 performing a second data detection process on the decoded output to yield a second detected output; and
 performing a second data decoding process on the second detected output.

7. The method of claim 6, wherein identifying the region of the storage medium from which the data set was derived as failing based at least in part on the first status value and the second status value is done exclusive of information from performing the second data detection process.

8. The method of claim 1, wherein the data detection process is a first data detection process, wherein the detected output is a first detected output, wherein the data decoding process is a first data decoding process, and wherein the method further comprises:
 performing a second data detection process on the decoded output to yield a second detected output;
 performing a second data decoding process on the second detected output; and
 wherein identifying the region of the storage medium from which the data set was derived as failing based at least in part on the first status value is done exclusive of information from performing the second data detection process.

9. The method of claim 8, wherein performing the second data decoding process fails to yield a converged data set, and wherein the status value is set to a value corresponding to a likelihood of a failing region of the storage medium.

10. The method of claim 1, wherein performing the data decoding process yields a converged data set, and wherein the status value is set to a value corresponding to a likelihood of a non-failing region of the storage medium.

11. A data processing circuit, the data processing circuit comprising:
- a first data detector circuit operable to:
  - perform a first data detection process on a data set;
  - provide a first detected output; and
  - generate a status value corresponding to the data set, wherein the status value includes at least one of: a number of violated checks identified in the data set during performance of the first data detection process on the data set, and a number of bit errors remaining in the first detected output;
- a data decoder circuit operable to perform a data decoding process on the first detected output and to yield a decoded output;
- a second data detector circuit operable to perform a detection process on the detected output and to yield a second detected output; and
- a storage medium mapping circuit operable to identify a region of a storage medium from which the data set was derived as failing based at least in part on the status value.

12. The data processing circuit of claim 11, wherein the first data detector circuit includes:
- a violated checks counter operable to provide the number of violated checks; and
- a bit error reporting circuit operable to output the number of bit errors.

13. The data processing circuit of claim 11, wherein the status value is a first status value, wherein the data decoder circuit is further operable to generate a second status value corresponding to the data set, and wherein the storage medium mapping circuit is further operable to identify the region of the storage medium from which the data set was derived as failing based at least in part on a combination of the first status value and the second status value.

14. The data processing circuit of claim 13, wherein the data decoder circuit includes:
- a violated checks counter operable to provide a number of violated checks identified in the data set during performance of the data decoding process on the first detected output; and
- a bit error reporting circuit operable to output a number of bit errors remaining in the decoded output.

15. The data processing circuit of claim 14, wherein the second status value includes at least one of the number of violated checks and the number of bit errors.

16. The data processing circuit of claim 11, wherein the data processing circuit is implemented as part of an integrated circuit.

17. The circuit of claim 11, wherein the circuit is implemented as part of a storage device.

18. A data storage device, the device comprising:
- a storage medium maintaining a data set at a region on the storage medium;
- a read/write head assembly operable to sense the data set on the storage medium and to provided a signal representing the data set;
- a data processing circuit including:
  - a first data detector circuit operable to:
    - perform a first data detection process on a derivative of the signal representing the data set;
    - provide a first detected output; and
    - generate a status value corresponding to the data set, wherein the status value includes at least one of: a number of violated checks identified in the data set during performance of the first data detection process on the data set, and a number of bit errors remaining in the first detected output;
  - a data decoder circuit operable to perform a data decoding process on the first detected output and to yield a decoded output;
  - a second data detector circuit operable to perform a detection process on the detected output and to yield a second detected output; and
  - a storage medium mapping circuit operable to identify a region of a storage medium from which the data set was derived as failing based at least in part on the status value.

19. The device of claim 18, wherein the first data detector circuit includes:
- a violated checks counter operable to provide a number of violated checks; and
- a bit error reporting circuit operable to output the number of bit errors.

20. The device of claim 18, wherein the violated checks counter is a first violated checks counter, wherein the bit error reporting circuit is a first bit error reporting circuit, wherein the number of violated checks is a first number of violated checks, wherein the number of bit errors is a first number of bit errors, wherein the status value is a first status value, wherein the data decoder circuit is further operable to generate a second status value corresponding to the data set, wherein the storage medium mapping circuit is further operable to identify the region of the storage medium from which the data set was derived as failing based at least in part on a combination of the first status value and the second status value, wherein the data decoder circuit includes:
- a second violated checks counter operable to provide a second number of violated checks identified in the data set during performance of the data decoding process on the first detected output;
- a second bit error reporting circuit operable to output a second number of bit errors remaining in the decoded output; and
- wherein the second status value includes at least one of the second number of violated checks and the second number of bit errors.

21. The device of claim 18, wherein the device is incorporated in a redundant array of disks.

22. A data processing system, the system comprising:
- a first data detector circuit operable to:
  - perform a data detection process on a data set;
  - provide a detected output; and
  - generate a status value corresponding to the data set, wherein the status value includes at least one of: a number of violated checks identified in the data set during performance of the data detection process on the data set, and a number of bit errors remaining in the detected output; and
- a data decoder circuit operable to perform a data decoding process on the detected output and to yield a decoded output.

23. The system claim 22, wherein the data detector circuit includes:
- a violated checks counter operable to provide the number of violated checks; and
- a bit error reporting circuit operable to output the number of bit errors.

24. The system of claim 22, wherein the system further comprises: a storage medium mapping circuit operable to identify a region of a storage medium from which the data set was derived as failing based at least in part on the status value.

25. The system claim 24, wherein the status value is a first status value, wherein the data decoder circuit is further operable to generate a second status value corresponding to the data set, and wherein the storage medium mapping circuit is further operable to identify the region of the storage medium from which the data set was derived as failing based at least in part on a combination of the first status value and the second status value.

* * * * *